(12) United States Patent
Scherer

(10) Patent No.: US 11,458,862 B2
(45) Date of Patent: Oct. 4, 2022

(54) METHOD FOR COORDINATING CHARGING PROCESSES OF ELECTRIC VEHICLES AS WELL AS ELECTRICALLY OPERATED MOTOR VEHICLE AND SUPPLY VEHICLE

(71) Applicant: AUDI AG, Ingolstadt (DE)

(72) Inventor: Christopher Scherer, Neumarkt (DE)

(73) Assignee: AUDI AG, Ingolstadt (DE)

( * ) Notice: Subject to any disclaimer, the term of this patent is extended or adjusted under 35 U.S.C. 154(b) by 683 days.

(21) Appl. No.: 15/936,819

(22) Filed: Mar. 27, 2018

(65) Prior Publication Data
US 2018/0281606 A1 Oct. 4, 2018

(30) Foreign Application Priority Data
Mar. 28, 2017 (DE) .......................... 102017205234.1

(51) Int. Cl.
*B60L 58/15* (2019.01)
*B60L 53/64* (2019.01)
(Continued)

(52) U.S. Cl.
CPC ............... *B60L 58/15* (2019.02); *B60L 53/64* (2019.02); *B60L 53/66* (2019.02); *B60L 53/67* (2019.02);
(Continued)

(58) Field of Classification Search
CPC ........ B60L 11/184; B60L 58/12; B60L 53/60; B60L 53/64; B60L 53/67; B60L 2260/52;
(Continued)

(56) References Cited

U.S. PATENT DOCUMENTS

| 2008/0077541 A1* | 3/2008 | Scherer | ................. G06Q 30/04 705/400 |
| 2011/0000726 A1 | 1/2011 | Tanaka | |

(Continued)

FOREIGN PATENT DOCUMENTS

| CN | 101953050 A | 1/2011 |
| CN | 104175898 A | 12/2014 |

(Continued)

OTHER PUBLICATIONS

European Office Action dated Apr. 22, 2020, in connection with corresponding EP Application No. 18 163 262.1 (9 pgs., including machine-generated English translation).

(Continued)

*Primary Examiner* — Robert Grant
(74) *Attorney, Agent, or Firm* — Maier & Maier, PLLC

(57) ABSTRACT

A method for coordinating charging processes of electric vehicles. A respective supply signal (S1), with at least data on an available quantity of energy and a current geographic position, is transmitted by mobile supplier units, and a respective demand signal (S2), with at least data on a demanded quantity of energy and a current geographic position, is transmitted by mobile procuring units to a central computer (P2). On the basis of the supply signals (S1) and the demand signals (S2), possible combinations, each composed of a supplier unit and a procuring unit, together with a respective evaluation value, are created by the central computer (P3). Specific combinations are selected by an optimization method (P4), and respective selected combinations and data regarding an energy transfer process are transmitted to the respective supplier units and the respective procuring units of the selected combinations by a coordination signal (S3) (P5).

9 Claims, 4 Drawing Sheets

(51) Int. Cl.
  *B60L 53/67* (2019.01)
  *B60L 53/66* (2019.01)
  *G05D 1/02* (2020.01)

(52) U.S. Cl.
  CPC .......... *G05D 1/021* (2013.01); *B60L 2240/62* (2013.01); *B60L 2240/68* (2013.01); *B60L 2240/72* (2013.01); *B60L 2260/52* (2013.01); *B60L 2260/54* (2013.01); *G05D 2201/0213* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
  CPC ............. B60L 2240/72; B60L 2240/68; B60L 2240/62; B60L 2260/54; G05D 1/021; G05D 2201/0213; Y02T 10/7072; Y02T 10/7005; Y02T 90/163; Y02T 90/121; Y02T 90/16; Y02T 90/128; Y02T 90/162; Y02T 10/7291; Y02T 90/14; G06Q 10/04; G06Q 50/06
  See application file for complete search history.

(56) References Cited

U.S. PATENT DOCUMENTS

| 2012/0271758 A1* | 10/2012 | Jammer | ................. B60L 50/66 705/39 |
| 2014/0089064 A1* | 3/2014 | Hyde | .................... B60L 53/14 705/14.4 |
| 2016/0129793 A1* | 5/2016 | Cronie | ................. B60L 11/182 320/109 |
| 2016/0311410 A1* | 10/2016 | Donzis | .................. B60K 15/05 |
| 2017/0138750 A1 | 5/2017 | Weber | |

FOREIGN PATENT DOCUMENTS

| CN | 105281383 A | 1/2016 |
| CN | 106314191 A | 1/2017 |
| CN | 106574843 A | 4/2017 |
| DE | 102009028565 A1 | 2/2011 |
| DE | 102010055102 A1 | 8/2011 |
| DE | 102012214750 A1 | 11/2013 |
| DE | 10 2013 203 794 A1 | 9/2014 |
| DE | 102013206903 A1 | 10/2014 |
| DE | 10 2014 220 256 A1 | 4/2016 |
| DE | 102015205811 A1 | 10/2016 |

OTHER PUBLICATIONS

German Office Action dated Jan. 24, 2018 of corresponding application No. DE102017205234.1, 16 pgs.

European Search Report dated Aug. 27, 2018, in connection with corresponding EP Application No. 18163262.1 (8 pgs.).

Chinese Office Action dated Jul. 27, 2021, in connection with corresponding CN Application No. 201810256025.6 (9 pp., including machine-generated English translation).

Office Action dated Feb. 18, 2021 in corresponding Chinese Office Action No. 201810256025.6; 17 pages including English-language translation.

\* cited by examiner

METHOD FOR COORDINATING CHARGING PROCESSES OF ELECTRIC VEHICLES AS WELL AS ELECTRICALLY OPERATED MOTOR VEHICLE AND SUPPLY VEHICLE

FIELD

The invention relates to a method for coordinating charging processes of electric vehicles as well as en electrically operated motor vehicle and a supply vehicle.

BACKGROUND

In accordance with the prior art, electrically operated motor vehicles have a range of travel of at most 500 km per rechargeable battery charge, which lies markedly above the travel distances needed in everyday life. For travel distances that exceed the maximum range of travel of a rechargeable battery charge, it is necessary to carry out a charging process. Two solution approaches exist for this problem. A first approach provides that travel is interrupted in order to carry out a charging process at a stationary charging station. In this case, such charging stations are located primarily in the immediate vicinity of superhighways on parking lots or service stops, for example. Preferably, a charging process thereby occurs by means of applying a fast charging technology, with which, at present, charging powers of up to 130 kW can be attained. It is possible in this way, for example, to charge to 80% an energy storage unit having an energy storage capacity of 90 kWh within 30 minutes. By means of this technology, it is possible to reduce the duration of travel interruption to an extent that is acceptable to the driver. Other concepts provide for an inductive recharging of electrically driven motor vehicles while travelling. In this case, it is provided that parts of the road network are furnished with apparatuses for carrying out inductive charging processes, as a result of which it is made possible to charge an electrically driven motor vehicle while travelling by way of an apparatus that is integrated into the road. For full-coverage use of this technology, however, it is necessary to equip large parts of the road network with charging apparatuses.

A method that makes possible a mobile recharging of an electrical energy storage unit of a motor vehicle is described in DE 10 2013 206 903 A1. The method comprises a request for mobile recharging of a motor vehicle, wherein a meeting place for the motor vehicle and a service vehicle is determined based on the position and remaining range of travel of the motor vehicle, and electrical energy is transferred from the service vehicle to the motor vehicle.

In DE 10 2010 055 102 A1, a method for recharging a traction battery of an electric vehicle is described. In this case, it is provided that, in flowing traffic, an electric vehicle is mechanically coupled to a towing vehicle, wherein, in one embodiment, electrical energy is transferred from the towing vehicle to the electric vehicle by means of an electric coupler.

In DE 10 2015 205 811 A1, a range extender vehicle and the use thereof is described. In this case, the range extender vehicle has autonomous driving means as well as receiving means for receiving data for locating the primary vehicle that is to be recharged.

In DE 10 2009 028 565 A1, an apparatus for charging electrically driven motor vehicles together with a method for operating the apparatus are described. The apparatus makes it possible to exchange electrical energy between two vehicles while travelling. In this case, an enhancement provides that, by means of a unit for wireless data transmission, it is possible to communicate the existence of a surplus of energy or of an energy need. The communication can be transmitted directly to another vehicle or to a charging station. In this case, it is also possible for the driver to set a price or a price range.

A drawback of the prior art is the fact that the steps described therein for the coordination between energy suppliers and energy recipients are designed for bringing them together in an isolated or local manner. Bringing together a plurality of energy suppliers with a plurality of energy recipients in a coordinated and long-term manner is not explicitly described.

SUMMARY

An object of the present invention is to provide a method that optimizes bringing together a multiple number of mobile energy recipients and mobile energy suppliers.

The invention provides a method for coordinating charging processes of electric vehicles. This method is characterized in that a respective supply signal, which comprises at least data on an available quantity of energy and a current geographic position, is transmitted from mobile supplier units to a central computer, and a respective demand signal, which comprises at least data on a demanded quantity of energy and a current geographic position, is transmitted from mobile procuring units to the central computer. At least on the basis of the supply signals and the demand signals, the central computer creates possible combinations, each composed of a supplier unit and a procuring unit, together with a respective evaluation value. In a next step, combinations are selected, taking into account the evaluation value, by means of an optimization method, and respective coordination signals are transmitted to the respective supplier units and the respective procuring units of the selected combinations, said coordination signals comprising the pertinent combination and data for carrying out an energy transfer. In a last step, the particular supplier units and the particular procuring units initiate an energy transfer process in accordance with the selected combination.

A mobile supplier unit can be, for example, an electrically driven motor vehicle, which is equipped for the purpose of transferring electrical energy to another electrically driven motor vehicle during a charging process and which supplies energy for this purpose.

A mobile procuring unit can be, for example, an electrically driven motor vehicle, which is equipped for the purpose of receiving electrical energy from another electrically driven motor vehicle during a charging process and which requests energy.

The supply signals and the demand signals can be transmitted, for example, via a GSM wireless network. A supply signal and/or a demand signal can be initiated manually by a driver or automatically by the motor vehicle electronics.

A central computer can be, for example, a computer with a microprocessor or a computer cluster.

A combination is composed of, respectively, a mobile supplier unit and an associated mobile procuring unit. In this case, the central computer generates an evaluation value, at least on the basis of the supply signals and the demand signal for each combination. An evaluation value describes the efficiency of a charging process carried out with such a combination. The evaluation value can be used for the selection of combinations from the possible combinations. This can occur, for example, by means of a mathematical maximization approach, wherein the evaluation value is used as a respective weighting factor for the respective combination. In this case, the selection of the combinations from the possible combinations can be made in such a way that combinations that lead to a maximum value of the evaluation value for the total system are chosen An energy transfer process describes a process for the transfer of energy from a supplier unit to a procuring unit. In addition to the actual charging process of a procuring unit by a supplier unit, the energy transfer process also comprises the approach of a supplier unit and a receiver unit to a computed meeting place, which can be transmitted from the central computer to both partners of a selected combination by means of a coordination signal. In this case, it is provided that the approach and the charging process are carried out in an automated manner by both motor vehicles. It may be the case that, prior to the initiation of an energy transfer process, at least of one of the drivers of one of the two motor vehicles has to confirm manually the initiation of the energy transfer process. The charging process can be produced by means of the use of a charging coupler by the particular combination partners. In this way, an energy storage unit of the supplier unit can be discharged and an energy storage unit of the supplier unit* can be charged. It may be the case that the two combination partners communicate via the charging coupler during or shortly before the charging process. It may be the case that parameters for carrying out the charging process are agreed on thereby, said parameters comprising, for example, a charging power or a quantity of energy that can be taken up by an energy storage unit. Accordingly, damage to energy storage units can be prevented. Preferably, the charging process takes place by means of direct current fast charging technology (DC fast charging technology).

An enhancement of the method provides that the supply signals and/or the demand signals comprise intended and/or possible routes of travel to a travel destination, which are utilized in the generation of the possible combinations and the respective evaluation values. In other words, the supplier units and the receiver units transmit the routes of travel to a travel destination that are planned by them and/or are possible for them, which can then be used by the central computer for creating and evaluating possible combinations. For example, a driver or an autopilot can determine which routes of travel to a destination are preferred and which other routes of travel to the destination are permitted. It can be the case, for example, that the preferred route of travel is the route of travel with the shortest distance and the possible routes of travel comprise those routes of travel that also lead to the travel destination and whose additional distances are less than a value that is defined by the driver or by the autopilot. The central computer can accordingly determine possible combinations not only on the basis of the current geographic position, but also on the basis of the intended routes of travel. Accordingly, in the creation of the evaluation values, it is possible to take into consideration whether at least one of the partners must travel over a distance that differs from its planned distance. This can worsen the evaluation. The advantage thereby ensues that the central computer can plan even further in advance.

An enhancement provides that data for current or predicted traffic situations are considered relative to their routes of travel and/or the possible paths between a supply unit and a procuring unit in order to compute the evaluation values. In other words, the central computer combines the routes of travel of the combination partners and/or the possible paths between a supplier unit and a procuring unit with current or predicted traffic situations in order to compute from them the evaluation values. Predicted traffic situations can comprise, for example, planned construction sites or traffic jam predictions based on recorded data. For example, one combination can have a lower evaluation value than a combination with an identical path length when, on the latter path, an increased volume of traffic is present or is predicted. There results from this the advantage that the probability of an assigned combination partner being absent owing to traffic is minimized.

An enhancement provides that the supply signals and/or the demand signals comprise intended and/or permitted travel times that are utilized in the creation of the possible combinations and the respective evaluation values. In other words, supplier units and procuring units can communicate to the central computer the travel times that are intended and/or permitted. For example, a supplier unit can communicate to the central computer a time when, at latest, it can arrive at the destination location or how long this travel can take at most. This results in the advantage that it can be ensured that, due to a charging process, a respective supplier unit and/or procuring unit does not arrive at the destination location after a permitted point in time.

An enhancement provides that the supply signals and/or the demand signals comprise a current state of charge, wherein the current state of charge is utilized in the creation of the possible combinations and the respective evaluation values. In other words, the current states of charge are transmitted to the central computer, so that the central computer can use this information to determine possible combinations and/or to take into consideration the necessity of a state of charge in computation of the evaluation value. Thus, the computation of the evaluation value can take place in such a way that motor vehicles with a low state of charge can be assigned a higher evaluation value. Accordingly, it is possible to super-prioritize these vehicles. This results in the advantage that an assignment based on need can occur.

An enhancement provides that the supply signals and/or the demand signals comprise a needed day range of travel, wherein the needed day range of travel is utilized in the creation of the possible combinations and the respective evaluation values. In other words, the units can transmit a needed day range of travel to the central computer, so that the central computer can take into consideration these values in the creation of the possible combinations and the respective evaluation values. For example, it can be the case that a route that is transmitted to the central computer comprises only a segment or that a return travel is planned on the same day. This results in the advantage that an assignment can occur not only on the basis of a current route of travel, but on the basis of a planned route of travel.

An enhancement provides that the supplier units and the procuring units are controlled in an automated manner at least during an energy transfer process. In other words, at least during an exchange operation, the control of the motor vehicle is taken over by an autopilot, which brings the two combination partners together. This results in the advantage that the two combination partners can be brought together reliably.

An enhancement of the method provides that the energy transfer process between the supplier unit and the respective procuring unit takes place by means of a supply vehicle. In this case, the supplier unit, the procuring unit, and the supply vehicle receive the respective coordination signal from the central computer. First of all, an energy transfer process for the transfer of energy from the supplier unit to the supply vehicle is carried out. In the next step, an energy transfer process for the transfer of energy from the supply vehicle to the procuring unit is carried out. In other words, there is no direct energy transfer process for the transfer of energy from the supplier unit to the procuring unit, but instead the transfer of the energy occurs indirectly by means of a supply vehicle, which acts as a linking element. Accordingly, a supply vehicle can, for example, recharge its energy storage unit in the event of a current surplus supply of electrical energy, as a result of which the supply vehicle does not have to travel to a charging station. This results in the advantage that, for each charging process, the vehicle does not need to leave its area of activity, which can be a superhighway, for example.

An enhancement of the method provides that accounting data are stored in the central computer, which are assigned to the respective procuring units and the respective supplier unit and whose respective values are changed after an energy transfer process between a supplier unit and a procuring unit. In other words, the transferred quantities of energy are accounted for in the central computer. It is possible, for example, that, depending on supply and demand, a specific energy value is fixed or that supplier units and procuring units establish individual prices. It can be the case, in particular, that the energy price rises when a procuring unit has a very urgent energy demand and, for this reason, is assigned a higher evaluation value. This results in the advantage that the method can be operated economically.

Belonging to the invention is also a supply vehicle, which is equipped to transmit supply signals and/or demand signals to the central computer and to receive coordination signals from the central computer. The supply vehicle is equipped to drive in an automated manner with a degree of autonomy of Level 5. The supply vehicle comprises an energy storage unit with an energy storage unit capacity of at least 100 kWh and, in the rear end region and/or in the front region, a respective charging coupler, which is equipped to establish a charging process and a communication process with another vehicle during driving operation. The charging coupler is equipped to transfer energy with a power of at least 100 kW during an energy exchange by means of a direct current fast charging process.

A degree of autonomy of Level 5 means that the supply vehicle is capable, without any human intervention, of driving and of taking part in road traffic. An energy storage unit can be, for example, a rechargeable battery, which can comprise an energy storage unit capacity of at least 100 kWh. It can be provided that, for the supply vehicles, special charging stations are established, which, preferably, are constructed in the vicinity of superhighways and are located at most 200 km apart from one another.

The invention also comprises an electrically operated motor vehicle that is equipped to drive autonomously with at least a degree of autonomy of Level 3. The electrically operated motor vehicle is characterized in that that it is equipped for transmitting supply signals and/or demand signals to the central computer and for receiving associated coordination signals from the central computer. In the rear end region and/or in the front region, the motor vehicle has a respective charging coupler, which is equipped to establish an energy exchange and a communication link with another vehicle during driving operation, wherein the charging coupler is equipped for transferring a power of at least 100 kW during an energy exchange by means of a direct current fast charging process. A degree of autonomy of Level 3 means that the motor vehicle is equipped so as to be able to drive in a highly automated manner. Preferably, it is provided that the motor vehicle has a degree of autonomy of Level 4 and is accordingly designed for fully automated driving. The electrically operated motor vehicle can be designed in such a way that it can act as a mobile procuring unit and/or as a mobile supplier unit. This results in the advantage that supply processes can be carried out not only by supply vehicles provided for this purpose, as a result of which the number of potential mobile supplier units is increased.

Belonging to the invention are also enhancements of the method according to the invention that have features such as those already described in conjunction with the enhancements of the motor vehicle according to the invention. For this reason, the respective enhancements of the method according to the invention are not described here once again.

BRIEF DESCRIPTION OF THE DRAWINGS

Exemplary embodiments of the invention are described below. Shown for this purpose are.

DETAILED DESCRIPTION OF THE DRAWINGS

Figure 1:
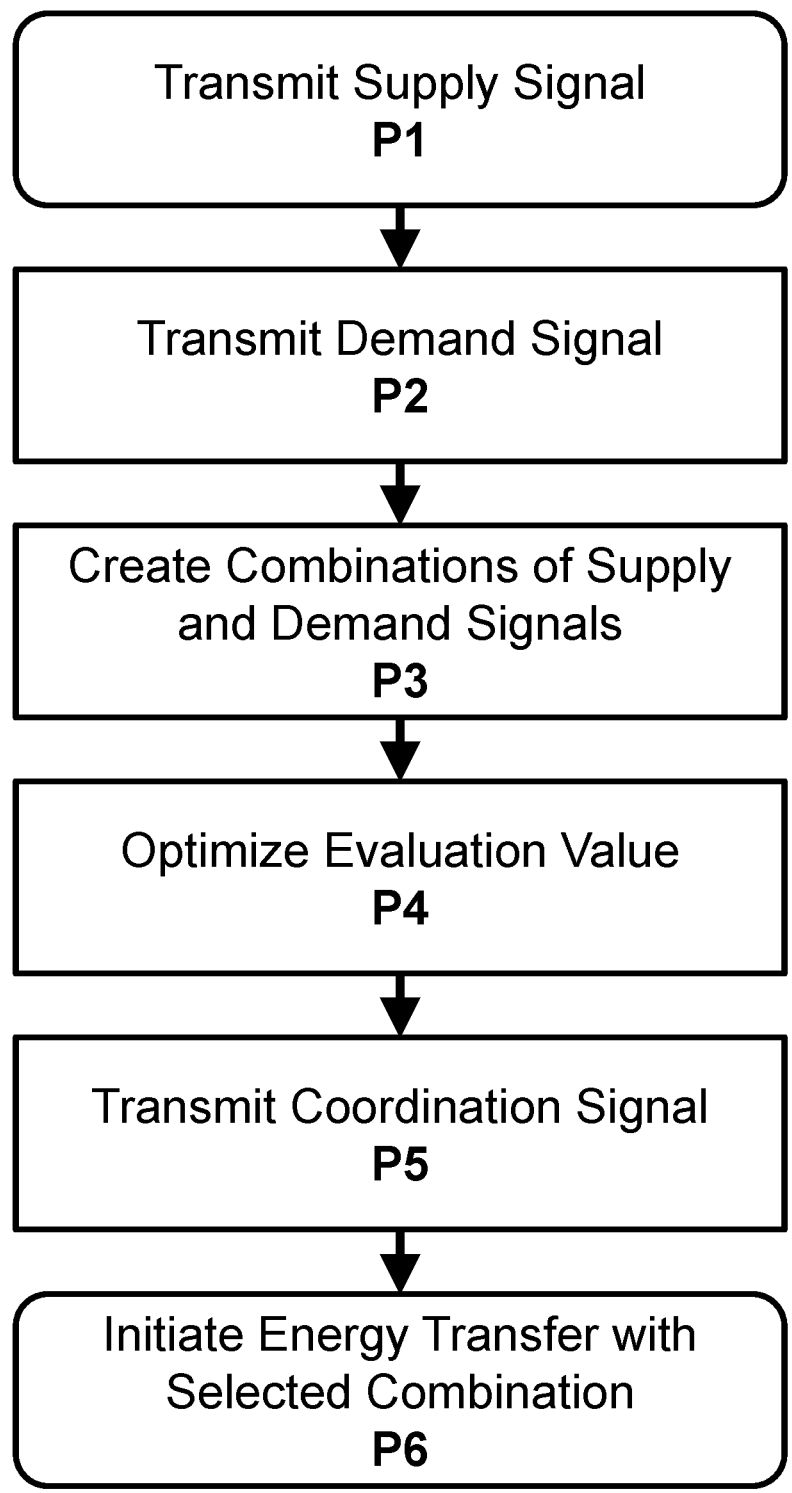
FIG. 1 a schematic course of the method,
FIG. 2 schematically, the interaction between the participants of the method,
FIG. 3 an electrically driven motor vehicle, and
FIG. 4 a supply vehicle.

The exemplary embodiments explained below involve preferred embodiments of the invention. In the exemplary embodiments, the described components of the embodiments respectively represent individual features of the invention, which are to be regarded as independent of one another and which the invention respectively further develops also independently of one another, and accordingly also are to be regarded, individually or in combinations, different from the combination shown, as a part of the invention. Furthermore, the described embodiments can also be supplemented by additional features of the invention that have already been described.

In the figures, functionally equivalent elements are each furnished with the same reference characters.

FIG. 1 shows schematically the course of the method. The method begins with the transmission P1 of a respective supply signal S1, which comprises at least data on an available quantity of energy and a current geographic position, from the mobile supplier units 1 to a central computer 2. The transmission of the signals can occur via a GSM network, for example. The respective supply signal S1 can also comprise additional data. Included for this purpose are, for example, intended and/or possible routes of travel to a travel destination, intended and/or permitted travel times, a current state of charge, or a needed day range of travel. A respective supply signal S1 can be emitted one time or permanently. A mobile supplier unit can be, for example, an electrically operated motor vehicle with at least one charging coupler 4 or a supply vehicle with at least one charging coupler 5. In a second step, a respective demand signal S2, which comprises at least data on a demanded quantity of energy and a current geographic position, can be transmitted from the mobile procuring units 3 to the central computer 2, P2. A mobile procuring unit can be, for example, an electrically operated motor vehicle with at least one charging coupler 4 or a supply vehicle with at least one charging coupler 5. The respective demand signal S2 can also comprise additional data. In the next step, at least on the basis of the supply signal S1 and the demand signal S2, possible combinations, each composed of a supplier unit 1 and a procuring unit 3, are created, together with a respective evaluation value, by the central computer 2, P3. Possible combinations means all theoretically possible combinations of a mobile supplier unit 1 and a mobile procuring unit 3. It is also possible to compute for each individual combination an evaluation value, which describes an efficiency value of the combination. The computation can take place at least on the basis of the supply signals S1 and the demand signals S2. It is also possible to incorporate additional data, to which belong, for example, data regarding current or predicted traffic conditions with the routes of travel and/or possible paths between a supplier unit 1 and a procuring unit 3.

The evaluation value can be used by means of an optimization method in order to select combinations, P4. The optimization method can involve, for example, a maximization method, which makes possible a choice of the combinations that lead to a maximum evaluation value of the total system. Taken into account in this case is the fact that it is not possible to select a combination that is optimal for each individual combination partner 1, 3. The selected combinations are transmitted to the respective supplier units 1 and to the respective procuring units 3 by means a coordination signal S3 from the central computer 2, P5. A coordination signal S3 can comprise data on the assigned combination partners 1, 3, a price for the energy transfer process, a geographic meeting place and meeting time with the combination partner, a path, a speed at which to travel, the quantity of energy to be transferred, and additional data. After receiving the coordination signal S3, the respective supplier units 1 and the respective procuring units 3 can initiate an energy transfer process in accordance with the selected combinations, P6. It may be the case that, for the initiation of the energy transfer process, a consent by an autopilot or a driver of at least one of the combination partners 1, 3 is required. Thus, it is possible, for example, prior to the initiation of an energy transfer process, to display an overview of the price, the quantity of energy, the path, and other values. An energy transfer process is intended to mean not only simply the exchange of energy in the course of a charging process, but this term can also include, for example, the path of travel toward the destination. It may be the case that the supplier units 1 and the procuring units 3 are controlled in an automated manner at least during the energy exchange process. This results in the advantage that it is better possible to bring together the combination partners 1, 3 in terms of location and time. It may be the case that it is more efficient to carry out a charging process with three partners. In this case, there is no direct energy transfer from the outbound mobile supplier unit 1 to the ultimate receiver unit 3, but, instead, there is an intervening partner, which acts as a mobile receiver unit 3 for the outbound mobile supplier unit 1 and as a mobile supplier unit 1 for the ultimate mobile receiver unit 3. In other words, the energy transfer process takes place by means of two combined energy transfer processes. Preferably, but not exclusively, this may involve a supply vehicle 5 which is intermediately connected.

Figure 2:
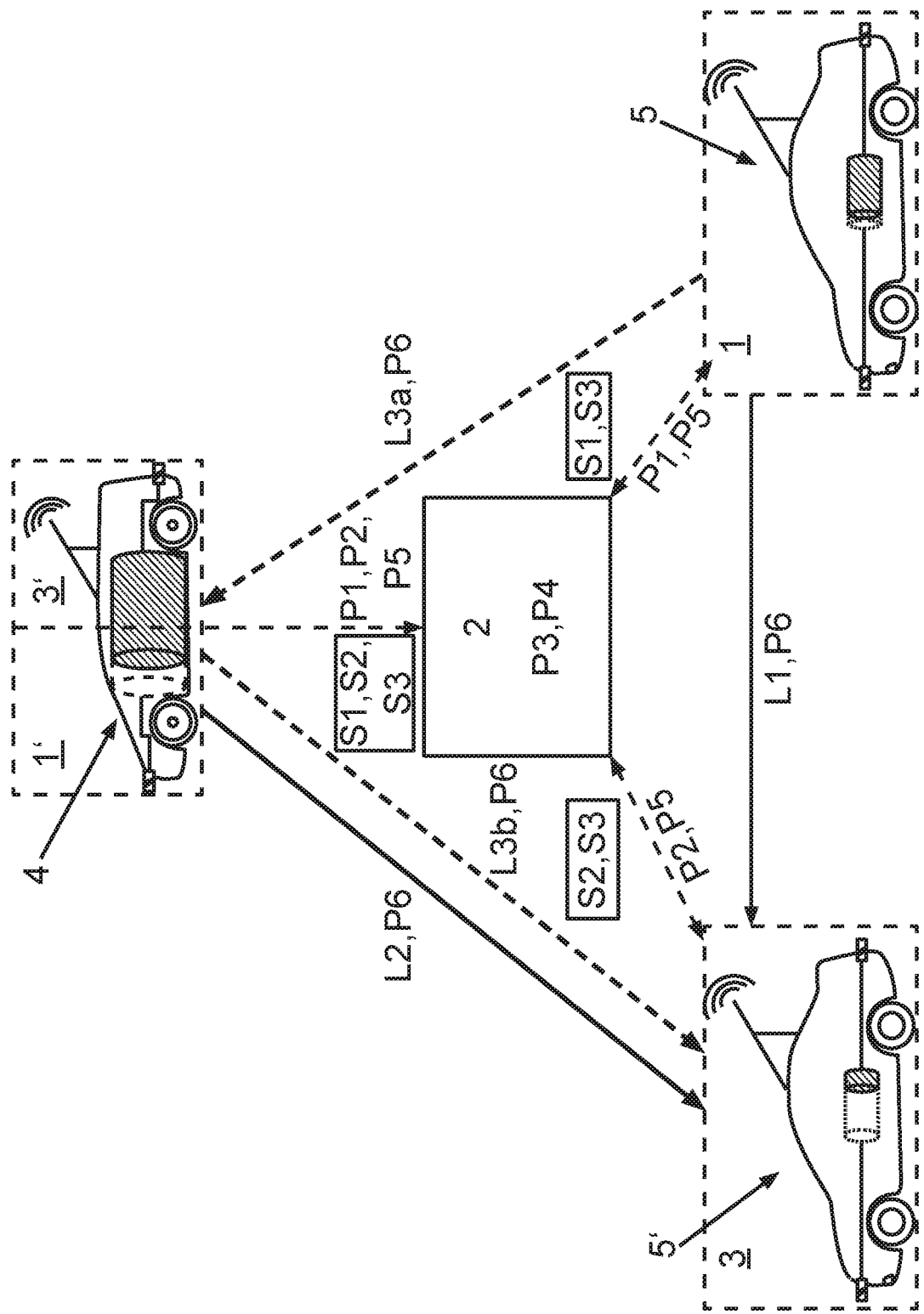

FIG. 2 shows schematically the possible interactions between the electrically operated motor vehicles 4, 5, 5' and the central computer 2. The participating motor vehicles 4, 5, 5' can transmit supply signals S1 and/or demand signals S2 to the central computer 2 and receive coordination signals S3 from the central computer 2. Shown in the figure are possible combinations of energy transfer processes L1, L2, L3*a*, L3*b*. It may be the case that, on the basis of the transmitted demand signals S2 and the transmitted supply signals S1, an evaluation value for a combination of a charged electrically driven motor vehicle 5 and an empty electrically driven motor vehicle 5' is selected. In this case, the central computer 2 transmits coordination signals S3 to the electrically operated motor vehicle 5, which can act as a mobile supplier unit 1, and to the electrically operated motor vehicle 5', which can act as a mobile procuring unit 3. Subsequently, the two electrically operated motor vehicles 5, 5' can initiate an energy transfer process P6. In this case, L1, energy is transferred directly from an electrically driven motor vehicle 5 to another electrically driven motor vehicle 5'. It may also be the case that a combination of a supply vehicle 4 and an electrically driven motor vehicle 5' can be selected by a central computer 2. In this case, L2, the supply vehicle 5' acts as a mobile supplier unit 1 and the electrically driven motor vehicle 5' acts as a mobile procuring unit 3. It may also be the case that an intermediate connection of a supply vehicle 4 is selected. In this case, the central computer 2 transmits coordination signals S3 to a first electrically driven motor vehicle 5, to the supply vehicle 4, and to the ultimate electrically driven motor vehicle 5'. A first energy transfer process P6 transpires in this case between the initial mobile supplier unit 1 and the supply vehicle 4, which, in the substep L3*a*, acts as a mobile procuring unit 3'. In the next subprocess L3*b*, the supply vehicle 4 can act as a mobile supplier unit 1' and the ultimate electrically driven motor vehicle 5' can act as a mobile receiver unit 3, wherein energy can be transmitted from the supply vehicle 4 to the ultimate mobile procuring unit 3.

Figure 3:
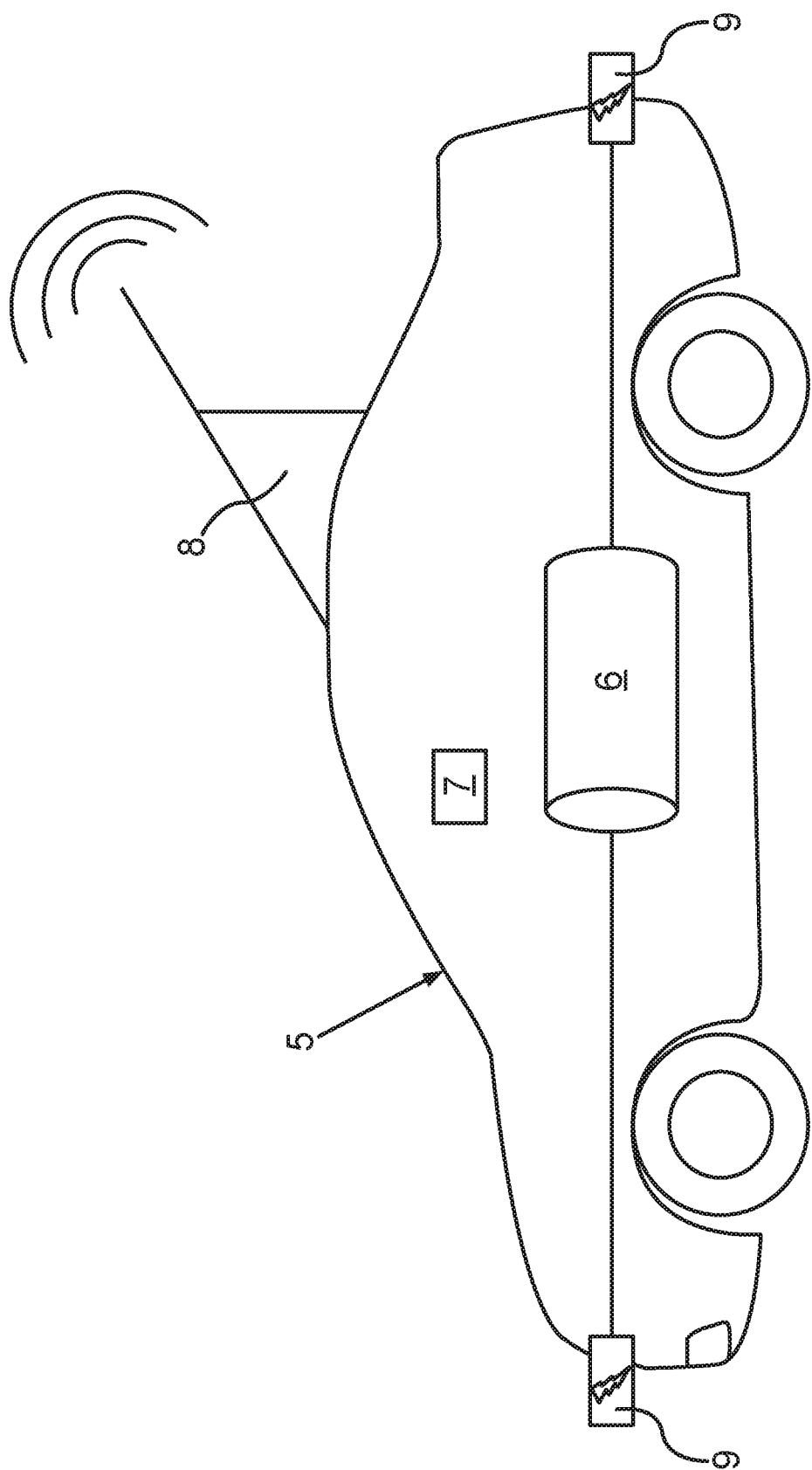

FIG. 3 shows an electrically driven motor vehicle 5, which can comprise an energy storage unit 6, a control unit 7 for an autopilot, a communication unit 8, and two charging couplers 9, which are respectively located at the front end and rear end of the motor vehicle. The control unit 7 can be equipped in such a way that an automated driving with a degree of autonomy of Level 3 or 4 is possible. The charging couplers can be equipped for transferring a power of at least 100 kW by means of a direct current fast charging process. The charging coupler can also be equipped for communicating with the combination partners during a charging process. In this way, it is possible to prevent any overcharging of an energy storage unit 6. The communication unit 8 can be equipped in such a way that a communication with the central computer 2 is possible.

Figure 4:
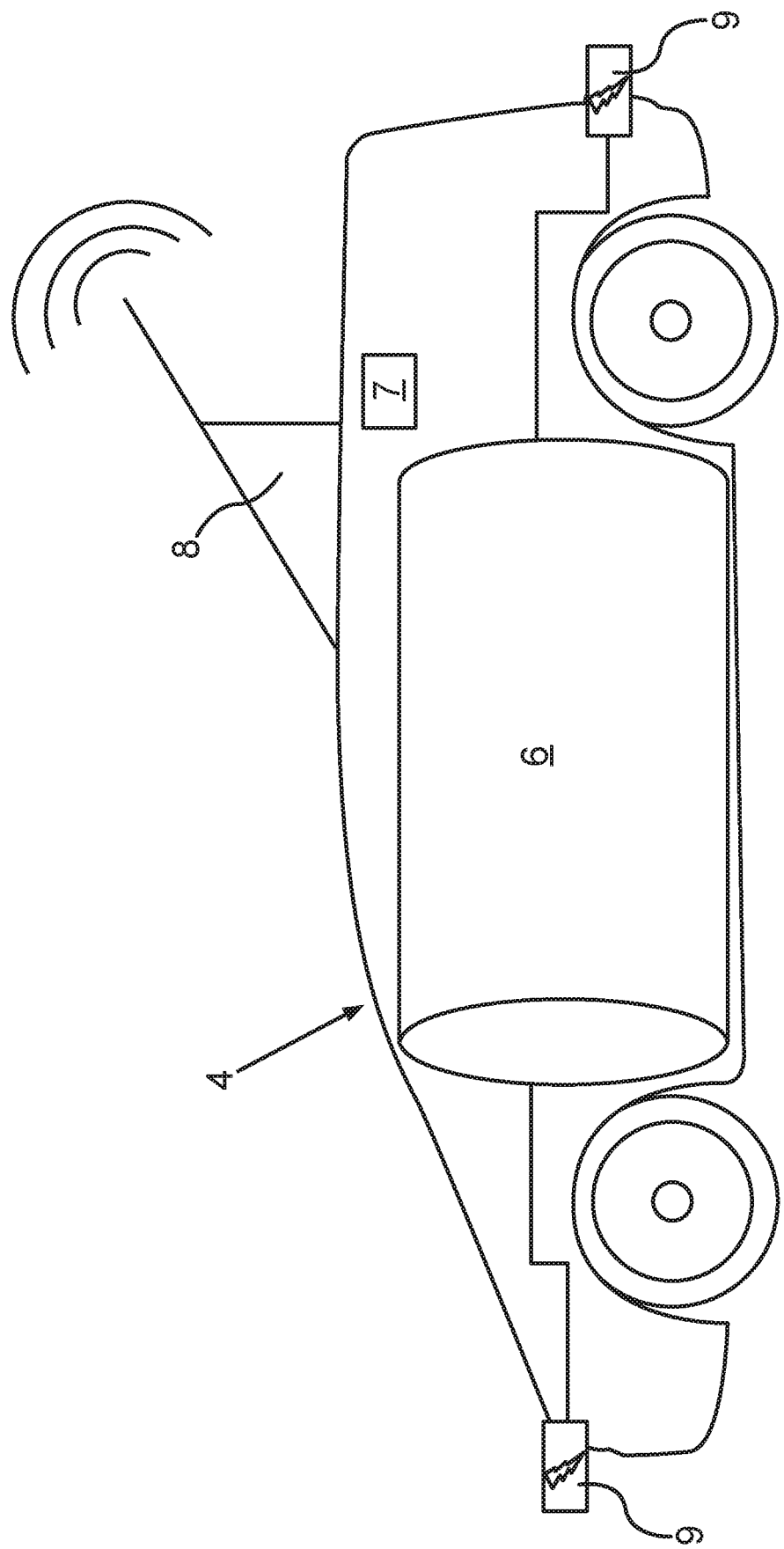

FIG. 4 shows a supplier vehicle 4, which can comprise an energy storage unit 6, a control unit 7 for an autopilot, a communication unit 8, and two charging couplers 9, which are respectively located at the front end and rear end of the motor vehicle. The control unit 7 can be equipped in such a way that an automated driving with a degree of autonomy of Level 5 is possible. The communication unit 8 can be equipped in such a way that a communication with the central computer 2 is possible. The charging coupler 9 can be equipped for transferring a power of at least 100 kW by means a direct current fast charging process. The charging coupler can also be equipped for communicating with the combination partners during a charging process. In this way, it is possible to prevent any overcharging of an energy storage unit 6. The energy storage unit 6 preferably has an energy storage unit capacity of least 100 kWh.

Overall, the examples show how, by way of the invention, a method for coordinating a charging system for the mobile charging of electrically driven motor vehicles is provided.

The invention claimed is:

1. A method for coordinating charging processes of electric vehicles, comprising:
   a respective supply signal (S1), with at least data on an available quantity of energy and a current geographic position, is received from mobile supplier units by a central computer (P1);

a respective demand signal (S2), with at least data on a demanded quantity of energy and a current geographic position, is received from mobile procuring units by the central computer (P2);

at least on the basis of the supply signals (S1) and the demand signals (S2), possible combinations, each composed of a supplier unit, a supply vehicle, and a procuring unit, together with a respective evaluation value, are compiled by the central computer (P3);

combinations, taking into consideration their respective evaluation values, are selected by an optimization method (P4);

the respective selected combination and data regarding an energy transfer process are transmitted to the respective supplier units, to the respective supply vehicles, and to the respective procuring units of the selected combinations by a coordination signal (S3) (P5); and the energy transfer process is initiated by the respective supplier units, the respective supply vehicles, and the respective procuring units from the selected combinations in accordance with the data of the coordination signals (S3) (P6), wherein the energy transfer process (P6) between the supplier unit and the respective procuring unit takes place via the supply vehicle, the supply vehicle being independent of the supplier unit and the respective procuring unit, wherein the supplier unit, the procuring unit, and the supply vehicle receive the respective coordination signal (S3) from the central computer;

wherein the supplier unit and the supply vehicle carry out an energy transfer process for transfer of energy from the supplier unit to the supply vehicle, and the supply vehicle and the procuring unit carry out an energy transfer process (P6) for transfer of energy from the supply vehicle to the procuring unit, wherein the optimization method selects combinations which lead to a maximum system evaluation value over combinations which only maximize the respective evaluation value, wherein the supply signals and/or the demand signals include permitted and/or preferred routes selected by a driver or an autopilot, which are taken into consideration in the creation of the possible combinations and the respective evaluation values.

2. The method according to claim 1, wherein the supply signals (S1) and/or the demand signals (S2) include planned and/or possible routes of travel to a travel destination, which are taken into consideration in the creation of the possible combinations and the respective evaluation values.

3. The method according to claim 1, wherein data regarding a current or predicted traffic situation is considered for the routes of travel and/or possible paths between at least one of the supplier units and at least one of the procuring units for the computation of the respective evaluation values.

4. The method according to claim 1, wherein the supply signals (S1) and/or the demand signals (S2) include planned and/or permitted travel times, which are taken into consideration in the creation of the possible combinations and the respective evaluation values.

5. The method according to claim 1, wherein the supply signals (S1) and/or the demand signals (S2) include a current state of charge, wherein the current state of charge is taken into consideration in the creation of the possible combinations and the respective evaluation values.

6. The method according to claim 1, wherein the supply signals (S1) and/or the demand signals (S2) comprise a needed day range of travel, wherein the needed day range of travel is taken into consideration in the creation of the possible combinations and the respective evaluation values.

7. The method according to claim 1, wherein accounting data are stored in the central computer, which are assigned to the respective procuring units and the respective supplier units and whose respective values are changed after an energy transfer process (P6) between procuring units and supplier units.

8. A supply vehicle, wherein:
the supply vehicle is equipped for the purpose of transmitting supply signals (S1) and/or demand signals (S2) to a central computer,
the supply vehicle is equipped for receiving a coordination signal (S3), relating to the supply vehicle, from the central computer;
the coordination signal comprises information pertinent for receiving charge from a mobile supplier unit and delivering charge to a mobile procuring unit;
the supply vehicle is equipped for driving in an automated manner with a degree autonomy of Level 5;
the supply vehicle includes an energy storage unit with an energy storage unit capacity of at least 100 kWh;
the supply vehicle has a respective charging coupler in a rear end region and/or in a front end region, which is equipped for the purpose of producing an energy exchange and a communication link with another vehicle during the driving operation, and
the charging coupler is equipped for the purpose of transferring a power of at least 100 kW during an energy exchange by a direct current fast charging process,
wherein the coordination signal arises from a specific combination of the supply vehicle, the mobile procuring unit, and the mobile supplier unit selected by the central computer according to an optimized total system evaluation value determined from a plurality of selected combinations of a plurality of supply vehicles, a plurality of mobile procuring units, and a plurality of supplier units,
wherein a respective evaluation value of the specific combination considers at least a preferred and/or a permitted route selected by a driver or an autopilot of the mobile procuring unit and/or the mobile supplier unit.

9. An electrically operated motor vehicle, which is equipped to drive autonomously with at least a degree autonomy of Level 3, wherein:
the electrically operated motor vehicle is equipped for the purpose of transmitting supply signals (S1) and/or demand signals (S2) to a central computer;
receiving a coordination signal (S3), relating to the electrically operated motor vehicle, from the central computer;
the coordination signal comprises information pertinent for the transfer of charge from a mobile supplier unit to a supply vehicle, and information pertinent for the transfer of charge from the supply vehicle to the electrically operated motor vehicle;
the motor vehicle has, respectively, in a rear end region and/or in a front end region, a charging coupler, which is equipped for the purpose of producing an energy exchange and a communication link with another vehicle during the driving operation, and the charging coupler is equipped for the purpose of transferring a power of at least 100 kW by means of a direct current fast charging process, wherein the coordination signal arises from a specific combination of the supply vehicle, the electrically operated motor vehicle, and the mobile supplier unit selected by the central computer according to an optimized total system evaluation value determined from a plurality of selected combinations of a plurality of supply vehicles, a plurality of electrically operated motor vehicles, and a plurality of supplier units, wherein a respective evaluation value of the specific combination considers at least a preferred and/or a permitted route selected by a driver or an autopilot of the electrically operated motor vehicle and/or the mobile supplier unit.

\* \* \* \* \*